United States Patent
Stanford et al.

(10) Patent No.: US 8,689,823 B2
(45) Date of Patent: Apr. 8, 2014

(54) HYDRO-PNEUMATIC SYSTEM WITH PRESSURE LIMITING VALVE

(75) Inventors: Frantz D. Stanford, Monona, WI (US); Bruce E. Knuth, Marshall, WI (US); Kay Lap Gilbert Chan, Madison, WI (US)

(73) Assignee: Actuant Corporation, Butler, WI (US)

( * ) Notice: Subject to any disclaimer, the term of this patent is extended or adjusted under 35 U.S.C. 154(b) by 793 days.

(21) Appl. No.: 12/446,611

(22) PCT Filed: Oct. 25, 2007

(86) PCT No.: PCT/US2007/082504
§ 371 (c)(1),
(2), (4) Date: Dec. 3, 2009

(87) PCT Pub. No.: WO2008/052105
PCT Pub. Date: May 2, 2008

(65) Prior Publication Data
US 2010/0104456 A1    Apr. 29, 2010

Related U.S. Application Data

(60) Provisional application No. 60/863,078, filed on Oct. 26, 2006.

(51) Int. Cl.
*F16K 31/12* (2006.01)
*F16K 31/36* (2006.01)
*F04B 35/00* (2006.01)
*F04B 35/02* (2006.01)

(52) U.S. Cl.
USPC .. 137/505.13; 417/375; 417/384; 137/505.21

(58) Field of Classification Search
USPC ............... 417/375, 379, 383, 384, 385, 388; 137/87.01, 458, 505.13, 505.21, 137/505.22
See application file for complete search history.

(56) References Cited

U.S. PATENT DOCUMENTS

| | | | | |
|---|---|---|---|---|
| 3,358,207 A * | 12/1967 | Natho | ............................. | 318/466 |
| 3,379,405 A * | 4/1968 | Natho | ............................. | 251/31 |
| 3,941,508 A | 3/1976 | Worden | | |
| 4,087,073 A * | 5/1978 | Runberg et al. | .................. | 251/28 |
| 4,186,766 A * | 2/1980 | Snyder | ........................... | 137/458 |
| 4,836,243 A * | 6/1989 | Ferrell | ........................... | 137/556 |
| 6,487,960 B1 * | 12/2002 | Chatufale | ................... | 92/165 R |
| 6,684,897 B2 * | 2/2004 | Sundararajan | ............. | 137/15.19 |

OTHER PUBLICATIONS

International Search Report and Written Opinion as mailed on Jul. 14, 2008 for International Patent Application PCT/US2007/082504.

* cited by examiner

*Primary Examiner* — Peter J Bertheaud
(74) *Attorney, Agent, or Firm* — Michael Best & Friedrich LLP

(57) ABSTRACT

A hydro-pneumatic system has an air powered motor driving a hydraulic pump with a pressure limiting valve that turns off air flow to the air motor when a hydraulic pressure output by the pump at a sense port of the valve reaches a certain limit. A valve element of the valve has spring, hydraulic and pneumatic sections, with an unbalanced area of the hydraulic section in a sealed pressure chamber of a cartridge that is part of the valve housing. The pneumatic section extends out one end of the cartridge to fill a bore between the air inlet and outlet ports when the pneumatic section is extended, and allow air to pass when it is retracted.

8 Claims, 2 Drawing Sheets ns to the preferred embodiments have been shown and described. However, clearly modifications and variations of those embodiments will be apparent from the foregoing description to those of ordinary skill in the art.

HYDRO-PNEUMATIC SYSTEM WITH PRESSURE LIMITING VALVE

CROSS-REFERENCE TO RELATED APPLICATION

This application is a national stage entry under 35 U.S.C. §371 of International Patent Application No. PCT/US2007/082504 filed Oct. 25, 2007, which claims the benefit of U.S. Provisional Patent Application No. 60/863,078 filed Oct. 26, 2006.

STATEMENT CONCERNING FEDERALLY SPONSORED RESEARCH OR DEVELOPMENT

Not applicable.

FIELD OF THE INVENTION

This invention relates to hydro-pneumatic systems, and in particular to such a system having a hydraulically actuated pneumatic valve.

BACKGROUND OF THE INVENTION

Hydraulic systems exist having pumps that are driven by compressed air driven motors. The peak hydraulic pressures generated by the pump are generally significantly greater than the pneumatic pressure used to drive the pump, but in many applications the peak hydraulic pressure obtainable is limited by the pneumatic pressure used to drive the pump and the operation of the pump relies on the pump stalling when that pressure is reached. In some of these pumps, the pneumatic motor will never stall due to leakage, losses, system design or pressure variation in the system. Particularly for these kinds of applications, some other means is desirable to cause the pneumatic motor to stop at a given limit of hydraulic pressure.

SUMMARY OF THE INVENTION

The present invention provides a hydraulic system with a pressure limiting valve that is hydraulically actuated to turn off the flow of air to the pump drive motor at a certain hydraulic pressure limit. The valve has a valve housing having an air inlet port and an air outlet port and a hydraulic fluid sense port. A valve element in the housing has a hydraulic section and a pneumatic section, the hydraulic section being in fluid communication with the hydraulic sense port and the pneumatic section being in fluid communication with the air inlet port and the air outlet port. The valve element is operable to open fluid communication between the air inlet port and the air outlet port in an open position of the pneumatic section and to close fluid communication between the two air ports in a closed position. The hydraulic section has an unbalanced area in fluid communication with the hydraulic fluid sense port that moves the valve element when a pressure in the hydraulic fluid sense port reaches a certain limit.

In preferred aspects, a spring urges the pneumatic section to the open position, and the spring force is preferably adjustable. In another aspect, the hydraulic section and the pneumatic section of the valve element are integral with one another, and a cartridge portion of the housing defines a hydraulic chamber in which the unbalanced area of the hydraulic section resides. The valve element can extend out of the cartridge at one end to a position in which it can close communication between the two air ports, and at the other end of the cartridge, can extend out of the cartridge to be acted on by a biasing spring.

These and other objects and advantages of the invention will be apparent from the detailed description and drawings.

DETAILED DESCRIPTION OF THE PREFERRED EMBODIMENTS

Figure 1:
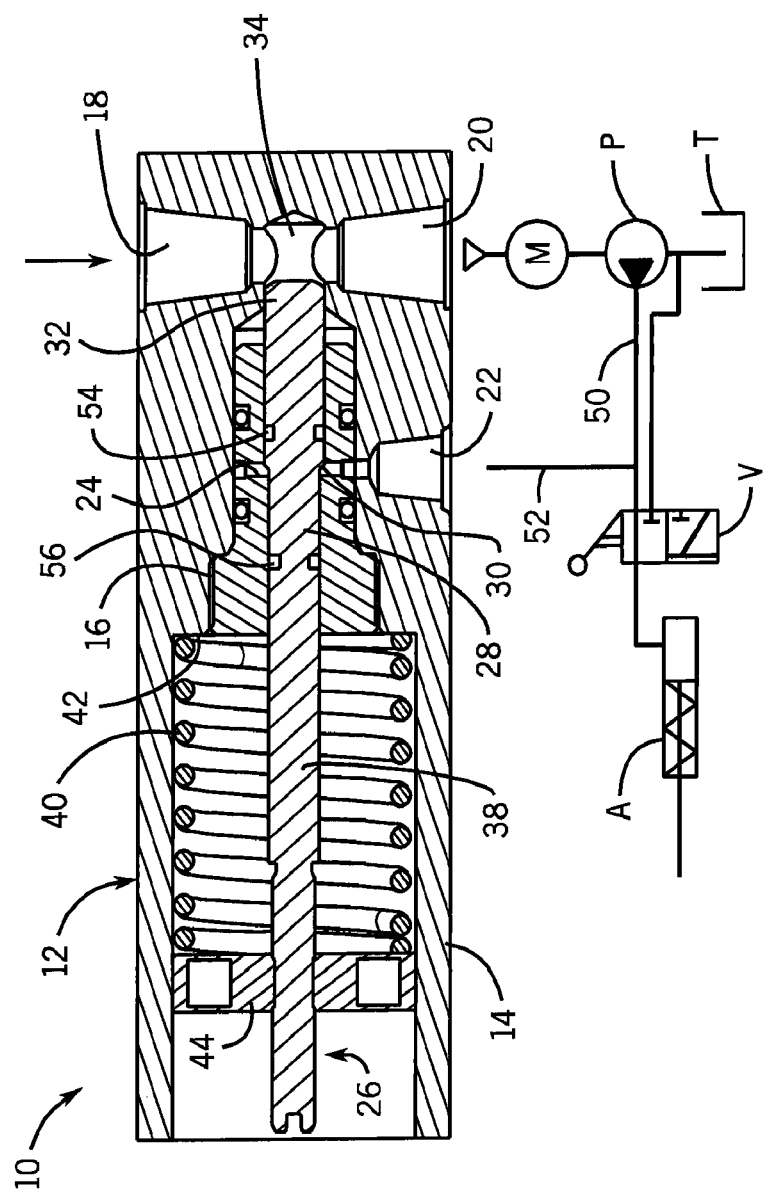
FIG. 1 is a cross-sectional view of a valve of the invention and schematically illustrating a hydro-pneumatic system incorporating the valve.
Figure 3:
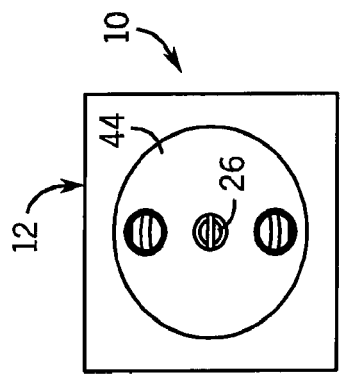
FIG. 3 is an end view of the valve.
Figure 2:
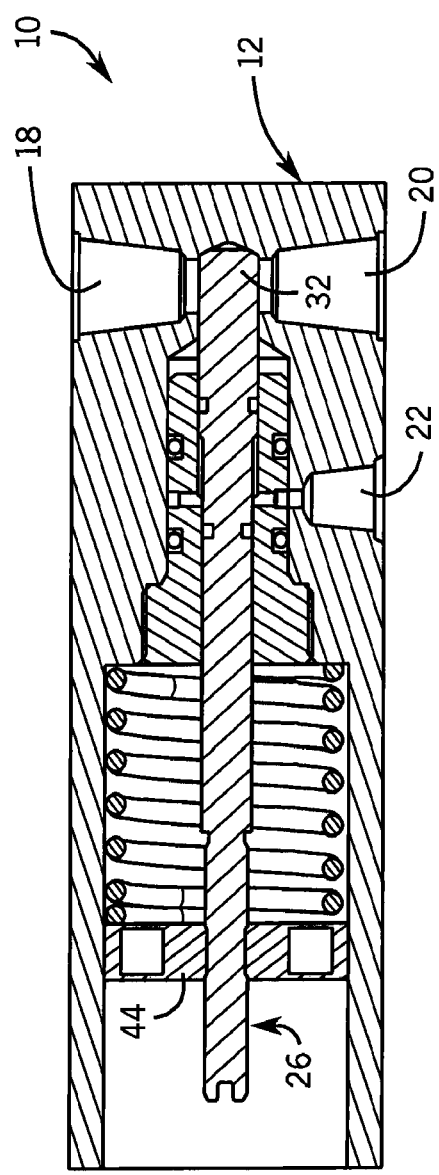
FIG. 2 is a view of the valve like in FIG. 1 but showing the valve in a closed state.

Referring to FIG. 1, a valve 10 of the invention has a housing 12 that includes a valve block 14 and a cartridge 16 that is screwed into the block 14. Valve block 14 has an air inlet port 18 and an air outlet port 20. Block 14 also has a hydraulic fluid sense port 22 that is in communication with chamber 24 of cartridge 16. A valve element 26 extends through chamber 24 and has a hydraulic section 28 having an unbalanced area 30 that is inside the chamber 24 and a pneumatic section 32 that is extendable into a bore 34 that extends between the two air ports 18 and 20. Section 32 fits closely with bore 34 in a sliding fit so that when section 32 is extended into bore 34 section 32 closes off fluid communication between the ports 18 and 20, as shown in FIG. 2.

Valve element 26 extends leftwardly from the cartridge 16 to a spring portion 38 surrounded by a compression spring 40 that is compressed between axially facing surface 42 of body 14 and a spring reaction member 44 that is threaded on the end of spring section 38 of the valve element 26. Turning the element 44 relative to the valve element 26 either compresses the spring more in one direction or relieves the compression on the spring 40 in the other direction to adjust the amount of spring biasing force on the element 26, which force biases the element 26 to move the pneumatic section 32 into the open position.

Hydraulic fluid introduced to the hydraulic fluid sense port 22 acts on the unbalanced area 30 in the chamber 24. Unbalanced area 30 is created by a difference in diameter in the element 26 that occurs between sliding seals 54 and 56, that creates a shoulder at the junction between the two diameters, identified at 30 in FIG. 1. A sufficient hydraulic pressure in chamber 24 acting on area 30 to overcome the force of air pressure acting on section 32 and the force of the spring 40, both of which act toward the left as viewed in FIG. 1, moves the element 26, and particularly the pneumatic section 32, to the right as viewed in FIG. 1. Port 18 communicates with one side of bore 34 and port 20 communicates with the other, so the presence of section 32 extended into the bore 34 completely closes communication between the air inlet port 18 and the air outlet port 20 as shown in FIG. 2 except for leakage, which is negligible.

Referring to FIG. 1, air can flow freely from air inlet port 18 to air outlet port 20 in the open position of element 26, transversely through the bore 34, to compressed air powered motor M. Motor M drives the hydraulic pump P to pump hydraulic fluid from tank T into line 50 and through valve V, when valve V so directs the fluid from line 50 as illustrated in FIG. 1, to actuator A. Line 52 connects line 50 with hydraulic sense port 22 to communicate the pressure of the pump P or the load A to the unbalanced area 30. When the pressure at port 22 reaches a high enough value, the force exerted by the hydraulic pressure on area 30 urges the valve stem 26 to the right, overcoming the force of spring 40, to close bore 34 and stop fluid communication from port 18 to port 20. This stops the air motor M which correspondingly stops driving the pump P. However, should the pressure at port 22 go down, spring 40 will overcome the hydraulic fluid force on area 30 to open communication between the air ports 18 and 20 and drive motor M to once again raise the pressure exerted on the load A until the pressure limit is once again reached to turn off the flow of air. Also, should the valve V be actuated so as to retract actuator A by directing the fluid in actuator A to the tank T (by shifting the valve upwardly to the lower position as illustrated in FIG. 1) and by blocking the flow from pump P, the pressure at port 22 will go up, until it reaches the limit of pressure exerted on area A (area 30) to overcome spring 40 and the air pressure and turn off the air from port 18 to port 20, thereby stopping the pump P.

A preferred embodiment of the invention has been described in considerable detail. Many modifications and variations to the embodiment described will be apparent to those skilled in the art so the invention should not be limited to the embodiment described.

We claim:

1. A hydraulic system, comprising:
   a source of hydraulic fluid;
   a hydraulic pump in communication with the source of hydraulic fluid to draw fluid from the source of hydraulic fluid and deliver the fluid under a supply pressure to a supply of hydraulic fluid;
   a source of compressed air;
   an air motor in communication with the source of compressed air that is powered by the source of compressed air to drive the hydraulic pump;
   a pressure limiting valve in communication with the source of compressed air and in communication with the supply pressure of the hydraulic fluid, said valve comprising:
      a valve housing having an air inlet port in communication with the source of compressed air and an air outlet port and a hydraulic fluid sense port in communication with the supply pressure of the hydraulic fluid;
      a valve element in the housing having a hydraulic section and a pneumatic section, the hydraulic section being in fluid communication with the hydraulic fluid sense port and the pneumatic section being in fluid communication with the air inlet port and the air outlet port and openable to provide fluid communication between the air inlet port and the air outlet port in an open position and operable to close fluid communication between the air inlet port and the air outlet port in a closed position;
   wherein the hydraulic section has an unbalanced area in fluid communication with the hydraulic fluid sense port such that a pressure limit at the hydraulic fluid sense port acts on the unbalanced area to move the valve element to the closed position which moves the pneumatic section into a position between the air inlet port and the air outlet port to block the flow of air between the air inlet port and the air outlet port.

2. A hydraulic system as claimed in claim 1, wherein the air outlet port is in fluid communication with the air motor.

3. A hydraulic system as claimed in claim 1, wherein air pressure and a spring urge the valve element to the open position.

4. A hydraulic system as claimed in claim 3, wherein the force of the spring is adjustable.

5. A hydraulic system as claimed in claim 1, wherein the hydraulic section and the pneumatic section of the valve element are integral with one another.

6. A hydraulic system as claimed in claim 1, wherein a cartridge portion of the housing defines a hydraulic chamber in which the unbalanced area of the hydraulic section resides.

7. A hydraulic system as claimed in claim 1, wherein the valve element further comprises a spring section within which a biasing spring acts on the valve element.

8. A hydraulic system as claimed in claim 1 wherein the unbalanced area is created by a difference in diameter in the valve element.

\* \* \* \* \*

UNITED STATES PATENT AND TRADEMARK OFFICE
CERTIFICATE OF CORRECTION

PATENT NO.        : 8,689,823 B2                                                                Page 1 of 1
APPLICATION NO. : 12/446611
DATED             : April 8, 2014
INVENTOR(S)       : Stanford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this
Twenty-ninth Day of September, 2015

Michelle K. Lee
*Director of the United States Patent and Trademark Office*